(12) United States Patent
Schmiedle et al.

(10) Patent No.: US 8,302,750 B2
(45) Date of Patent: Nov. 6, 2012

(54) MULTI-POLE CONDUCTOR LINE

(75) Inventors: Andreas Schmiedle, Lörrach (DE); Jörg Mutz, Eschbach (DE)

(73) Assignee: Conductix-Wampfler AG, Weil am Rhein-Markt (DE)

( * ) Notice: Subject to any disclaimer, the term of this patent is extended or adjusted under 35 U.S.C. 154(b) by 129 days.

(21) Appl. No.: 12/664,148

(22) PCT Filed: Jun. 10, 2008

(86) PCT No.: PCT/EP2008/057221
§ 371 (c)(1),
(2), (4) Date: Mar. 5, 2010

(87) PCT Pub. No.: WO2008/152033
PCT Pub. Date: Dec. 18, 2008

(65) Prior Publication Data
US 2010/0252297 A1    Oct. 7, 2010

(30) Foreign Application Priority Data
Jun. 11, 2007 (DE) .................. 10 2007 026 907

(51) Int. Cl.
*B60M 1/34* (2006.01)
(52) U.S. Cl. ..................... 191/23 R; 174/68.2
(58) Field of Classification Search ............... 191/22 C, 191/22 R, 23 R, 29 R, 30, 31, 32, 33 R; 174/68.2, 174/72 B, 71 B, 73.1, 70 B, 99 B, 129 B, 174/133 B, 149 B
See application file for complete search history.

(56) References Cited

U.S. PATENT DOCUMENTS
| 2,534,804 A | 12/1950 | Tiscione |
| 2,619,553 A | 11/1952 | Kroeckel |
| 3,181,102 A | 4/1965 | Fehr, Jr. |
| 3,345,471 A | 10/1967 | Kilburg |

(Continued)

FOREIGN PATENT DOCUMENTS
DE    2311614 A1    9/1973
(Continued)

OTHER PUBLICATIONS
Written Opinion published Dec. 11, 2009 for PCT/EP08/57221.
(Continued)

*Primary Examiner* — S. Joseph Morano
*Assistant Examiner* — Zachary Kuhfuss
(74) *Attorney, Agent, or Firm* — Martin Fleit; Paul D. Bianco; Fleit Gibbons Gutman Bongini & Bianco PL

(57) ABSTRACT

The invention relates to a multi-pole conductor line comprising a plurality of insulating profiles disposed one after another in the longitudinal direction, each having a regular arrangement of a plurality of chambers extending in the longitudinal direction. At least one group of chambers is present that are closed in cross section, and at least one group of chambers that are open to one side and are suitable for mounting one busbar each. Connecting links made of insulating material are provided for connecting the front sides of the insulating profiles. Said links each have as components at least one plug element that can be plugged into a closed chamber of the insulating profile at the front side of an insulating profile, and at least one stop element limiting the plug depth of a plug element into an insulation profile, and preferably at least one catch element by which a form-fit engagement between the connecting link and an insulating profile can be produced.

15 Claims, 8 Drawing Sheets

U.S. PATENT DOCUMENTS

| | | | |
|---|---|---|---|
| 3,506,099 | A | 4/1970 | Howell, Jr. |
| 3,601,748 | A | 8/1971 | Hart |
| 3,771,103 | A | 11/1973 | Attema |
| 3,900,240 | A | 8/1975 | Bertrams et al. |
| 3,909,810 | A | 9/1975 | Naden et al. |
| 4,022,967 | A | 5/1977 | Bulanchuk |
| 4,105,099 | A | 8/1978 | Bertrams et al. |
| 4,109,768 | A | 8/1978 | Fromme et al. |
| 4,279,456 | A | 7/1981 | Zucchini |
| 4,494,808 | A | 1/1985 | Widell et al. |
| 4,812,134 | A | 3/1989 | Miller et al. |
| 4,859,193 | A | 8/1989 | Pfannkuche et al. |
| 4,897,048 | A | 1/1990 | Liebon et al. |
| 4,919,625 | A | 4/1990 | Coutre |
| 5,012,746 | A | 5/1991 | Bormann et al. |
| 5,261,840 | A | 11/1993 | Benz |
| 6,039,584 | A | 3/2000 | Ross |
| 6,241,064 | B1 | 6/2001 | Hierzer |
| 2010/0181098 | A1 | 7/2010 | Schmiedle |

FOREIGN PATENT DOCUMENTS

| | | | |
|---|---|---|---|
| DE | 2358895 | A1 | 6/1974 |
| DE | 2717134 | C2 | 11/1978 |
| DE | 3311362 | C1 | 7/1984 |
| DE | 3440776 | A1 | 5/1986 |
| DE | 29501448.2 | U1 | 5/1995 |
| DE | 19647336 | A1 | 5/1998 |
| DE | 19701987 | C1 | 5/1998 |
| DE | 19755513 | A1 | 6/1999 |
| DE | 19917309 | A1 | 12/1999 |
| DE | 19912574 | A1 | 11/2000 |
| DE | 201 05 232 | U1 | 8/2001 |
| DE | 10159401 | A1 | 6/2003 |
| DE | 10257646 | A1 | 6/2004 |
| DE | 10359541 | A1 | 7/2005 |
| EP | 0524084 | A1 | 1/1993 |
| EP | 0666621 | A2 | 8/1995 |
| EP | 0871263 | A2 | 10/1998 |
| EP | 1750342 | A1 | 2/2007 |
| FR | 2679385 | A1 | 1/1993 |
| GB | 2137150 | | 10/1984 |
| GB | 2137439 | A | 10/1984 |
| NL | 1019697 | A1 | 3/2002 |
| WO | 01/91250 | A1 | 11/2001 |
| WO | 03/049238 | | 6/2003 |
| WO | 2007/017133 | | 2/2007 |
| WO | 2008/152032 | | 12/2008 |
| WO | 2008/152033 | | 12/2008 |

OTHER PUBLICATIONS

International Preliminary Report on Patentability published Dec. 11, 2009 for PCT/EP08/57221.
International Search Report published Dec. 18, 2008 for PCT/EP2008/057219.
Written Opinion published Dec. 11, 2009 for PCT/EP08/57219.
International Preliminary Report on Patentability published Dec. 11, 2009 for PCT/EP08/57219.
International Search Report mailed Jun. 10, 2008 for PCT/EP2008/057221.
Montagevorschrift, Wampfler Solutions for a moving world, Kompakt-Schleifleitung Programm 831, p. 1-9, www.wampler.com, printed Jan. 21, 2004.
International Preliminary Report published Jan. 12, 2010, for PCT/EP2008/057221, dated Jun. 10, 2008.
Written Opinion, published Jan. 11, 2010, for PCT/EP2008/057221, dated Jun. 10, 2008.

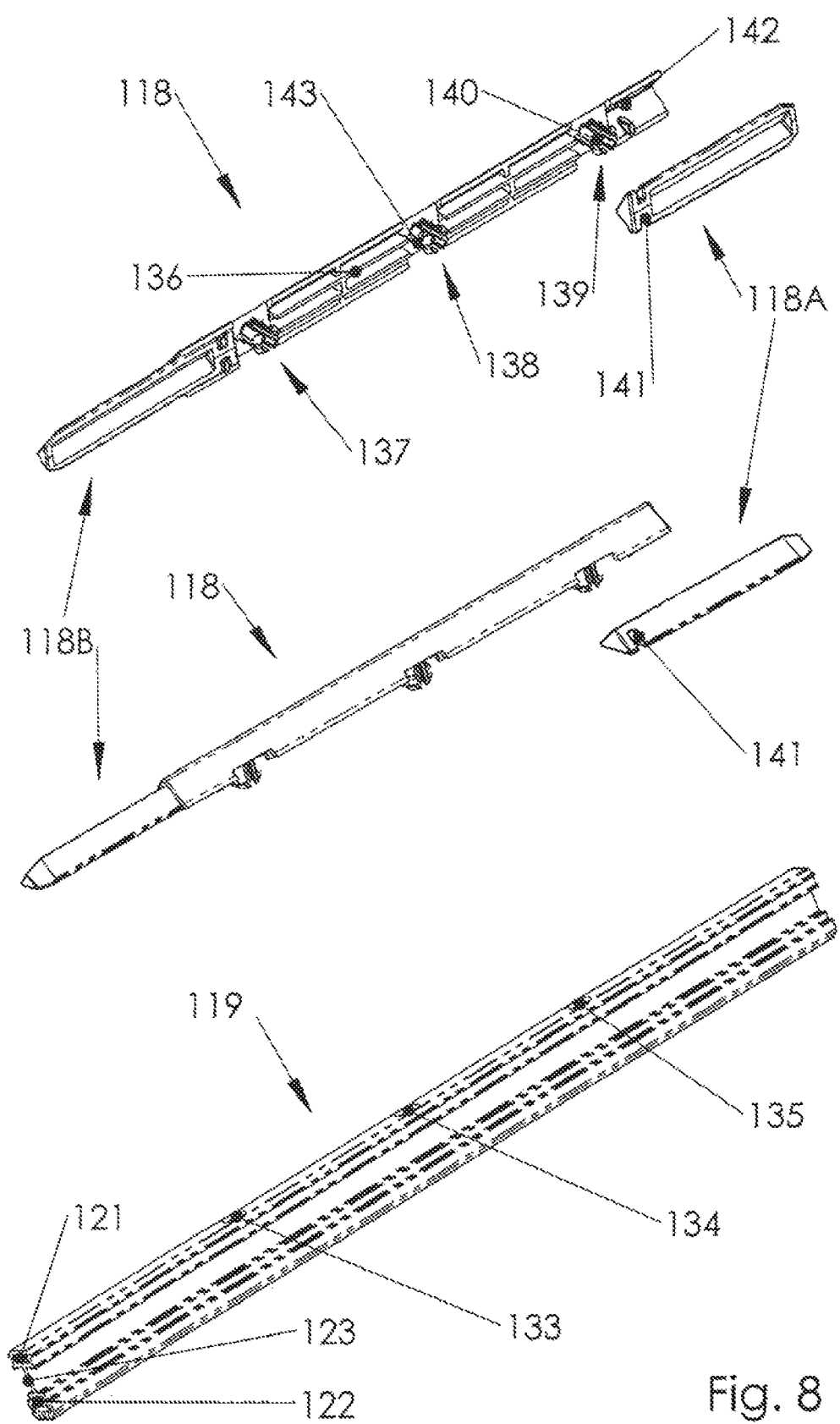

MULTI-POLE CONDUCTOR LINE

BACKGROUND OF THE INVENTION

The invention relates to a multi-pole conductor line. Such conductor lines are known, for example, from DE 103 59 541 A1 and from DE 199 17 309 A1. Here, it involves an extruded plastic profile in which the busbars of the conductor line are arranged insulated from each other. The profile is made from a plurality of chambers of which one group is open toward the front side of the profile. In the chambers of this group, the busbars are arranged and accessible from the open front side for the current collector of a vehicle traveling along the conductor line. Two other groups of chambers that are closed in cross section form the rear base of the profile and the insulation between the busbars, respectively.

Conductor lines of this type generally have a total length that makes it necessary to arrange several insulating profiles one after the other at the end faces. Here, a mechanically stable connection between the individual insulating profiles of a conductor line must be created, wherein suitable connection elements are used. For engaging such connection elements, a corresponding shaping of the end regions of the insulating profiles is necessary that cannot be performed in the scope of the extrusion, but instead requires later processing, which increases the production expense.

In addition, there is the problem that, at the connection points between the individual insulating profiles of a conductor line, the insulating effect is broken. There, the lengths of the air gaps and creep paths between the individual busbars, i.e., the shortest paths between the surfaces of two adjacent busbars through free space or along the surface of the insulating profile, which are specified by the cross-sectional shape along an insulating profile, no longer intersect. Instead, at such a connection point, if additional measures are not taken, the length of the air gap is given by the direct distance of two adjacent busbars and the length of the creep path is given by the shortest path between two adjacent busbars on the end face of the insulating profile. These lengths effective at a connection point are generally significantly shorter than the corresponding lengths along the insulating profile.

The lengths of the air gaps and creep paths are subject to appropriate safety regulations that must be observed under the aspect of product liability, and, indeed, along an entire conductor line, i.e., also at said connection points. This is naturally more difficult to achieve if the total dimensions of a conductor line are to be more compact.

One possibility for extending the air gaps and creep paths at the connection points between the individual insulating profiles to safety-regulation values consists in the joining of additional insulating elements in this region in the course of the assembly of the individual insulating profiles. For this purpose, the end regions of the insulating profiles must be prepared for holding said insulating elements, wherein additional expense is incurred in the production of the insulating profiles. This applies especially when later processing of the insulating profiles must be performed on the end faces.

In the present context, the large difference between the coefficients of thermal expansion of the metallic busbars, which are typically made from copper, and the insulating profiles made from plastic represents another problem. Due to the sometimes considerable length of a conductor line, this would lead to thermally induced longitudinal stresses of enormous magnitude, if countermeasures in the form of providing expansion joints were not taken. At such expansion joints, the problem of interrupting the insulation effect of the insulating profiles presents itself in intensified form, because here a gap of considerable and also variable extent between two successive insulating profiles must be taken into account and must be corrected in terms of insulation.

In view of these conditions, one problem of the invention is to specify a novel and useful solution for the connection of successive insulating profiles of a multi-pole conductor line, with this solution guaranteeing a sufficient length of the air gaps and creep paths between the busbars of the conductor line and being distinguished through a lowest possible processing expense in the assembly.

SUMMARY OF THE INVENTION

This problem is solved according to the invention by a conductor line with the advantageous features of the disclosure.

The invention starts with a multi-pole conductor line with an insulating profile of a known type and provides, for end-face connection of the insulating profiles, connection elements, with these connection elements being made from insulating material and each having, as components, at least one plug element that can be inserted into a closed chamber of the insulating profile at the end face of an insulating profile and also having at least one stop element that limits the insertion depth of a plug element in an insulating profile.

Thus, in a simple way, with only a few components and processing steps on the end faces, a mechanically stable and electrically insulating connection can be created between successive insulating profiles of a conductor line. The insulating profiles are oriented flush with each other by the connection elements, wherein the cross section of the chambers open toward the front side is not narrowed, so that the current collectors running there are not blocked at the connection points. The plug elements project into those closed chambers that are located directly between the busbars. In this way, the short air gaps otherwise present here at the connection points between the current collectors are interrupted and lengthened to a length that is determined by the geometry of the plug elements. With respect to this function, the connection elements are made exclusively from insulating material. The connection elements thus fulfill a double function, namely both that of the mechanical connection of the insulating profiles in flush alignment with each other and also that of additional insulation between the busbars at the connection points of two insulating profiles.

Preferably, a connection element according to the invention is shaped and sized in its dimensions so that the minimal length of a path has a specified minimum length that runs on the surface of a connection element and that leads from a first point on the surface of the connection element lying closest in the provided installation state of the connection element into an insulating profile of a first busbar to a second point on the surface of the connection element lying closest to another busbar. In this way, it is namely guaranteed that the length of the total effective creep paths between two busbars on the end face of an insulating profile is at least not significantly shortened by the insertion of a connection element.

It is especially advantageous when the connection element also has at least one catch element through which a form-fit engagement can be created between the connection element and an insulating profile. In this case, the connection elements also fulfill the function of the mechanical attachment of the insulating profiles to each other with respect to the longitudinal direction of the conductor line. Here, one embodiment of the invention provides for a fixed, i.e., non-moving connection, while another embodiment provides a connection with a specified clearance for thermally induced expansion and contraction movements in the longitudinal direction.

BRIEF DESCRIPTION OF THE DRAWINGS

Additional details and advantages of the invention emerge from the subordinate claims and from the following description of an embodiment with reference to the drawings. Shown in the drawings are:

DETAILED DESCRIPTION OF THE INVENTION

Figure 1:
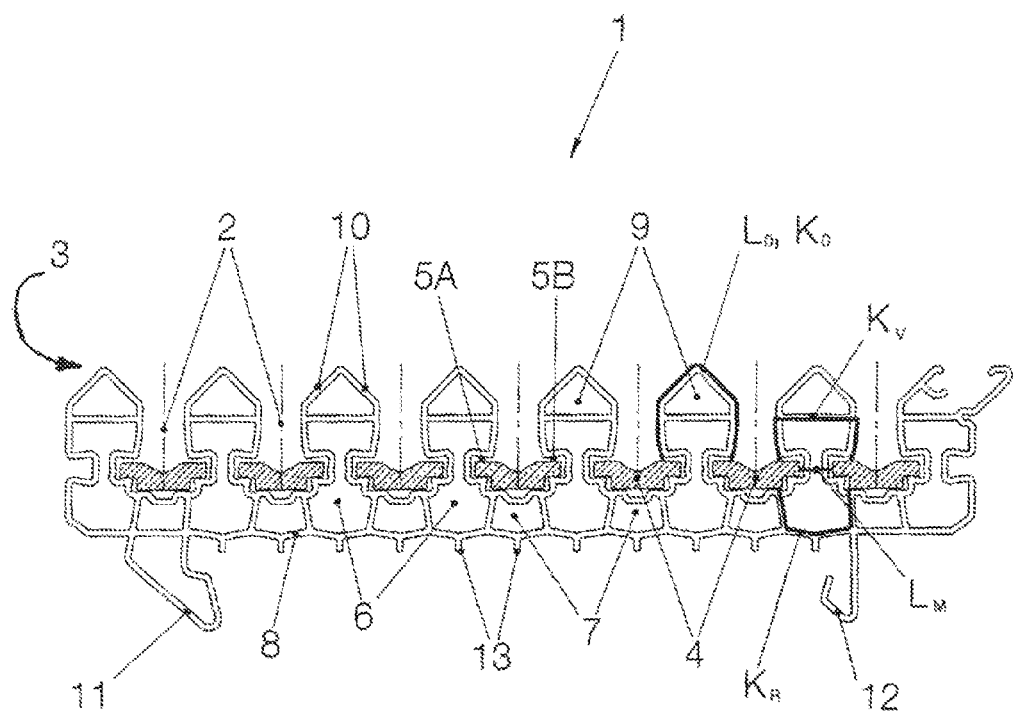
FIG. 1, a cross-sectional view of an insulating profile according to the invention, FIG. 2, a cross-sectional view of the insulating profile from FIG. 1 in connection with a carrier profile, FIG. 3, a perspective view of the insulating profile from FIG. 1, FIG. 4, a perspective view of a cutout of the insulating profile from FIG. 1 with connection elements of a first type according to the invention in two different positions, FIG. 5, a connection element of a first type according to the invention in four different views, FIG. 6, a cross-sectional view of an enlarged cutout of the insulating profile from FIG. 1 with a plug of a connection element of a first type located therein, FIG. 7, a perspective view and also a side view of a modification of the insulating profile of FIG. 1, with a modified end region and a connection element inserted therein of a second, multi-part type, and FIG. 8, three perspective views of components of a connection element of a second, multi-part type.

As is to be seen from FIG. 1, an insulating profile 1 has, in cross section, a regular arrangement of several chambers that extend, in the longitudinal direction of the profile, i.e., vertical to the plane of the drawing of FIG. 1. One group of chambers 2 is open toward one side in cross section and therefore defines an open front side 3 of the insulating profile 1 located at the top in FIG. 1. Each of the chambers 2 of the open group has two undercuts 5A and 5B suitable for the form-fit holding of a busbar 4. Wall sections of several adjacent closed chambers 6 and 7 together form a rear wall 8 of the insulating profile 1 lying opposite the open front side 3 of the insulating profile and located at the bottom in FIG. 1.

The terms "open" and "closed" used here in connection with a group of chambers do not mean a property of the grouping, but instead a property of each of the individual chambers belonging to the group. The term "group" here shall express that all of the chambers belonging to a group have the same cross-sectional shape. The position of the insulating profile 1 shown in FIG. 1 is not necessarily its installation position at a position of use, because this is typically upright, that is, rotated by ±90° relative to the diagram of FIG. 1. However, it may also be rotated by 180°. In so far as terms, such as "top" and "bottom" designating vertical arrangements are used here, these merely refer to the position of the insulating profile 1 in FIG. 1.

The chambers 6 of a first closed group extend from the rear wall 8 of the profile 1 in the direction of the open front side 3 of the profile 1 via the undercuts 5A, 5B of the chambers 2 of the open group. Each chamber 6 of this first closed group is arranged between two adjacent chambers 2 of the open group. A narrowing of the widths in the middle region is produced for the chambers 6 of the first closed group by means of the undercuts 5A, 5B. Between two adjacent chambers 6 of the first closed group there is a chamber 7 of another closed group underneath the chamber 2 of the open group lying in-between. On the open front side 3 of the insulating profile 1 there is a chamber 9 of another closed group between two adjacent chambers 2 of the open group, with this chamber bordering a chamber 6 of the first closed group, that is, on its top, i.e., front end. The outer wall 10 of a chamber 9 facing the front side 3 of the profile 1 has, in cross section, a forward-projecting shape, in the example shown in FIG. 1, essentially that of a gabled roof.

As is directly visible from the cross-sectional view of FIG. 1, the shortest connection between two adjacent busbars 4 runs along an insulating profile 1 both in free space and also on the surface of an insulator each on the front-side surface of the insulating profile 1, i.e., the lengths $L_O$ and $K_O$ of the so-called air gaps and creep paths are equally long and specified by the cross-sectional shape of the wall sections of the closed chambers 6 facing the open chambers 2 and also the outer walls 10 of the closed chambers 9. In FIG. 1, the coinciding air gaps and creep paths $L_O$ and $K_O$ in this case are designated on a chamber 6 and the associated chamber 9 by a thick line along the said wall sections and outer walls, respectively.

On one end face of an insulating profile 1, however, its insulation effect is broken, so that if additional measures were not taken, the air gaps $L_M$ would be given by simply the shortest distance between two adjacent busbars 4. This air gap $L_M$ that is significantly shorter than the air gap $L_O$ active along the profile 1 is designated by a short thick line in FIG. 1 at one position.

For the creep path, here the cross-sectional shape of the chambers 6 lying between the busbars 4 is decisive, because now a creep current can flow on the end face of the profile 1 along the end faces of the walls of the chambers 6. For such a creep current, the walls of the chambers 6 provide two paths, namely one via the front side of the profile 1 and one via the rear side of the profile 1. Each of the creep paths $K_V$ and $K_R$ are similarly recorded in FIG. 1 as thick lines. While the creep path $K_R$ runs via the rear wall 8 of the profile 1, for the creep path $K_V$, the separating wall between each chamber 6 and adjacent chamber 9 is decisive. This separating wall contributes to the mechanical stability and does not harm the length of the effective creep path, because the lengths of the two creep paths $K_V$ and $K_R$ are approximately equal in the embodiment shown in FIG. 1. Leaving out said separating wall would indeed lengthen the creep path $K_V$, but not the overall effective creep path, because the latter is determined by the shorter of the two creep paths $K_V$ and $K_R$.

As can be seen from FIG. 1, the extent of the chambers 6 provides, over a large portion of the height of the profile 1, i.e., from the rear wall 8 up to significantly past the undercuts 5A, 5B, for a relatively large value of the lengths of the creep paths $K_V$ and $K_R$. To achieve the same creep-path length for a smaller extent of the chambers 6 in height, the lateral extent of the chambers 6 would have to be larger, which would lead overall to a widening of the profile 1. This would run counter to the goal of the most compact construction possible, as pursued in modern conductor lines. The shape of the chambers 6 according to the invention allows a compact construction of a conductor line to be accommodated with the observance of the regulated minimum lengths of the creep paths at the end-face connection points of the individual insulating profiles 1 that belong unavoidably to the construction of a conductor line of typical length.

The rear-side creep path $K_R$ may be lengthened indeed through the elimination of the construction of the chambers 7 lying behind the busbars 4, i.e., through a direct bordering of adjacent chambers 6 behind a busbar, but this would negatively affect the stability of the profile 1, because each busbar 4 would be supported in this case by only a single chamber separating wall. In addition, the overall effective creep-path length would not be lengthened, because this would then be determined by the front-side creep path $K_V$.

Figure 2:
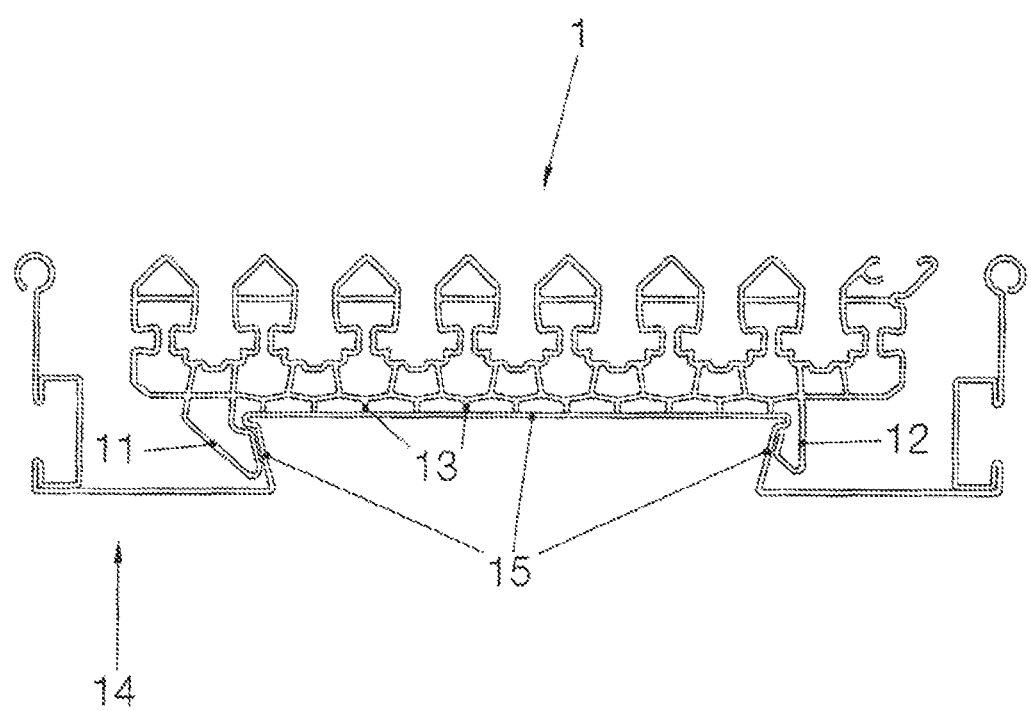

In FIG. 1, two essentially hook-shaped attachment elements 11 and 12 formed in one piece on the rear wall 8 and also ribs 13 projecting perpendicularly from the rear wall 8 can be seen. These elements are used for attaching the insulating profile 1 on a carrier profile 14 shown in FIG. 2. As FIG. 2 shows, the carrier profile 14 has, in its middle section 15, a shape complementary to the rear side of the insulating profile 1, so that the insulating profile 1 can be snapped with the help of the attachment elements 11 and 12 onto the middle section 15 of the carrier profile 14 and is then connected to this with a form fit. Here, the ribs 13 support the rear wall 8 of the insulating profile 1 on the carrier profile 14.

Figure 3:
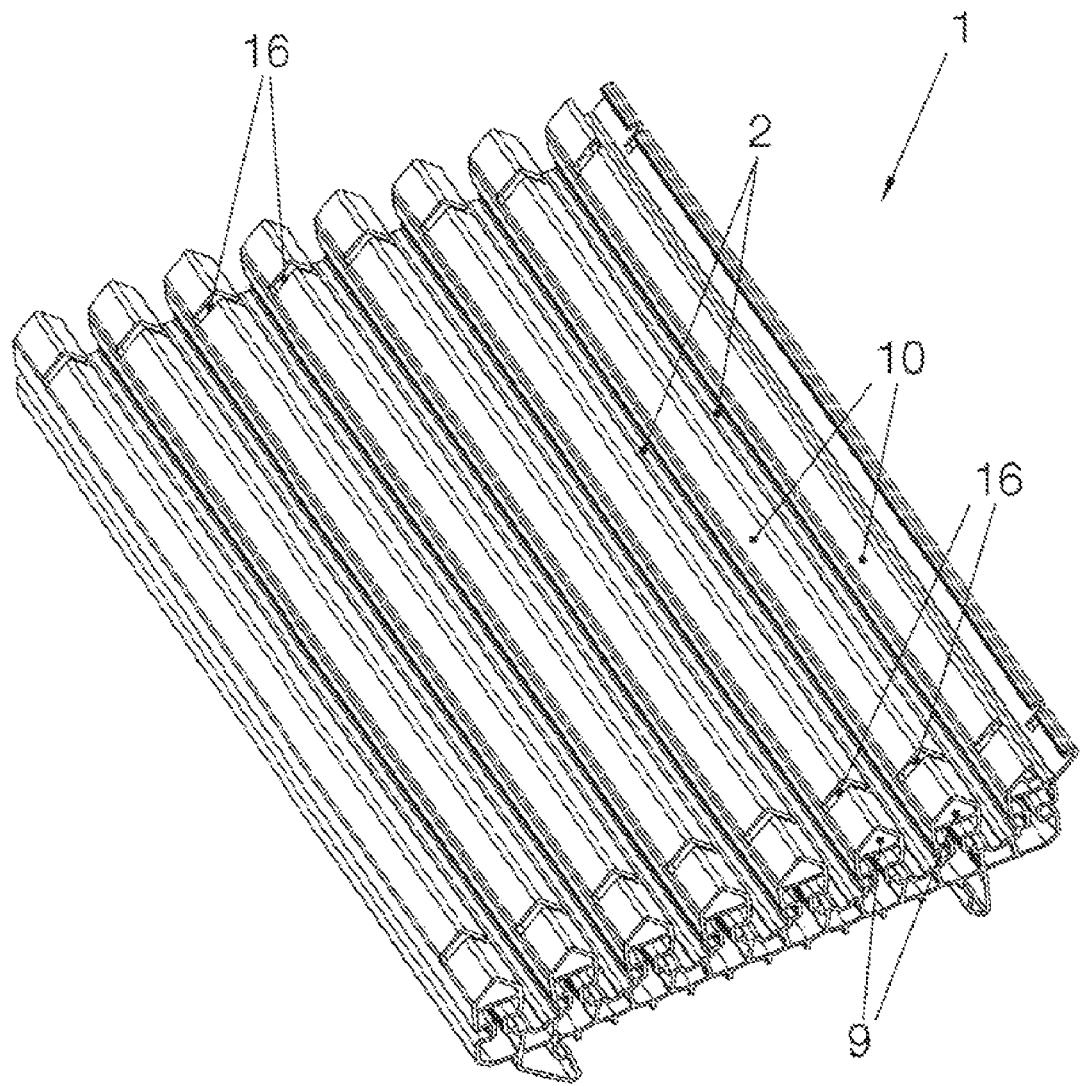

FIG. 3 shows a perspective view of an insulating profile 1 according to the invention. Here, the length is not drawn to scale in relation to the width, but instead is greatly shortened. Especially visible in the view of FIG. 3 are openings 16 in the projecting outer walls 10 of the chambers 9 close to the two ends of the insulating profile 1, i.e., at a specified distance from its end faces. These openings 16 all have the same shape, i.e., an overall equal length in the longitudinal direction of the profile 1, as well as an overall equal width perpendicular to the length. In the shown embodiment in which each of the outer walls 10 has the shape, essentially, of a gabled roof, the width of an opening 16 extends across nearly the entire width of a chamber 9.

The openings 16 are used for the form-fit, end-face connection of several insulating profiles 1 to each other using suitable connection elements, which will be further explained with reference to FIGS. 4 and 5. The advantage of this shape of openings 16 consists in that all of the openings 16 can be produced close to one of the two ends of the profile 1 in an extremely efficient way by means of a single cut in the transverse direction, wherein the length of the openings 16 in the longitudinal direction of the profile 1 is given from the width of the cutting blade and the width in the transverse direction is given for a given, convex shape of the outer wall 10 of a chamber 9 from the depth of the cut. Serial processing for the production of each individual opening 16 is thus unnecessary. It is understood that a projecting shape of the front-side wall sections 10 of the profile 1 between the open chambers 2, with these sections being formed by the outer walls 10 of the chambers 9, represents the prerequisite for the ability to produce the openings 16 in such a way.

As previously explained, the shaping of the chambers 6 according to the invention already provides, by itself, for a sufficient creep-path length at a connection point of two insulating profiles 1. The creation of an air gap of regulated length still requires the insertion of an insulating element into the chambers 6 at the connection points, in order to break the initially much too short air gap $L_M$, as is marked in FIG. 1. This measure is shown in FIG. 4 with reference to a cutout of the insulating profile 1 according to the invention. The cutout shows at the bottom left a connection element 17 made completely from an insulating material in front of a closed chamber 6 in an orientation in which it can be inserted through linear displacement into the chamber 6, wherein a part of the connection element 17 simultaneously also reaches into the chamber 9 lying above. Above this, another identical connection element 17 may be seen that is already inserted completely, i.e., as much as possible, into the chamber 6.

Figure 5:
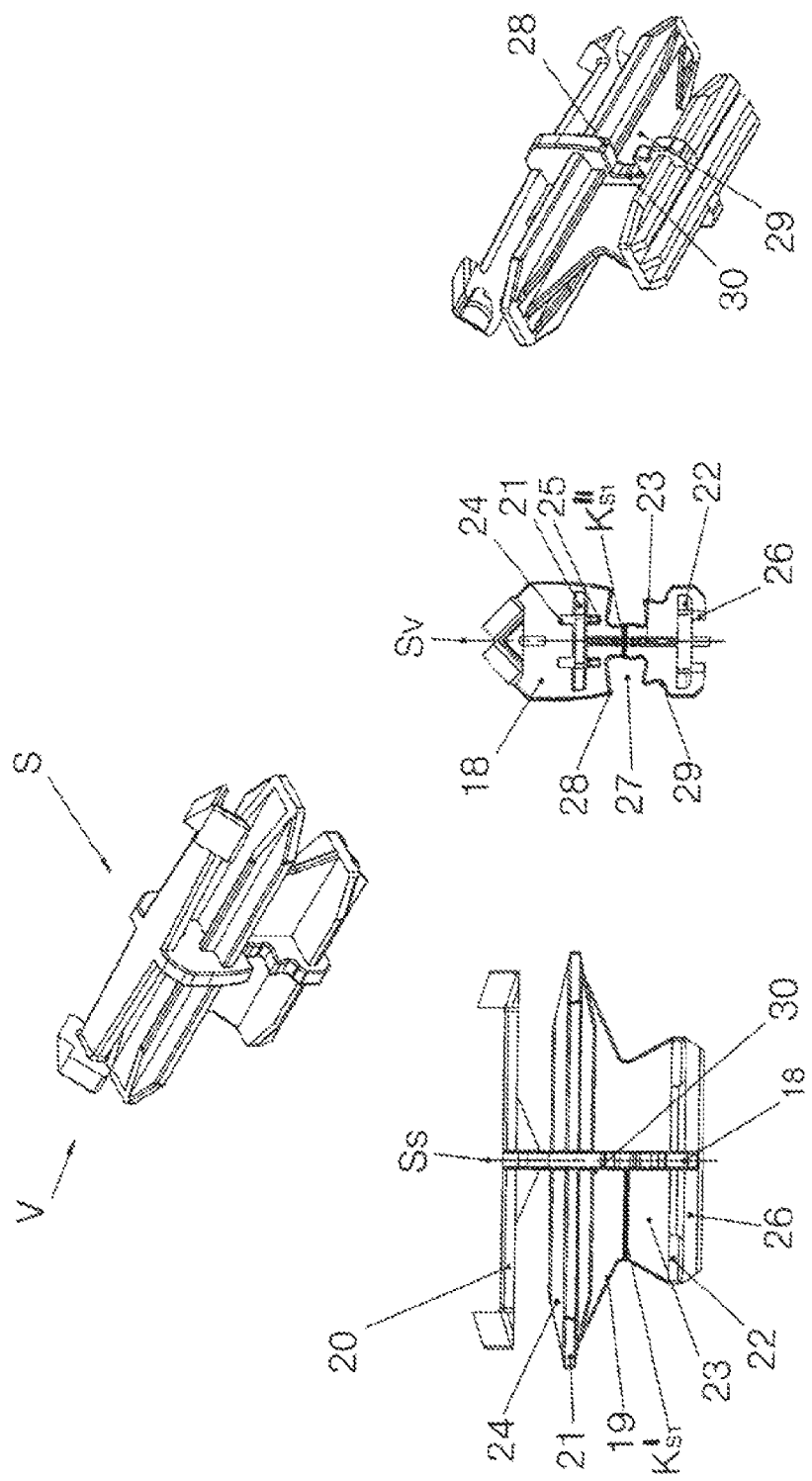

The connection element 17 is shown in FIG. 5 in four views, namely at the top left in a perspective view from above, in the middle left in a side view, in the middle right in a front view, and at the bottom right in a perspective view from below. In the perspective view at the top left, the directions of the side view and the front view are each indicated by arrows designated with S and V, respectively. In the side and front views, lines of symmetry $S_S$ and $S_V$, respectively, are drawn with dashed lines that mark a plane of symmetry running perpendicular to the plane of the drawing.

The connection element 17 is a one-piece component. It is made from a base plate 18, two plugs 19 projecting perpendicularly from the base plate 18 symmetric to its center plane, as well as two snap hooks 20 projecting perpendicularly from the base plate also symmetric to its center plane. For the sake of clarity, in the side view, only one of the two symmetric halves is provided with reference numbers. The outer contours of the plug 19 is adapted to the inner contours of the chamber 6 so that the plug 19 can be inserted into the chamber 6 at one end face of the insulating profile 1. As is to be seen especially in the perspective diagrams and in the front view, the plug 19 has, seen from the front, an upper and a lower transverse web 21 and 22, respectively, and between these two a main web 23, so that it has, in the front view, approximately the basic shape of the capital letter I. This shape corresponds to the cross-sectional shape of the chamber 6, wherein the main web 23 is allocated to the central narrowing of the chamber 6 through the undercuts 5A, 5B of the adjacent open chambers 2, while the two transverse webs 21 and 22 are allocated to the two wider regions of the chamber 6 above or below said central narrowing.

The outer contours of the cross section of the plug 19 do not have to correspond exactly to the inner contours of a chamber 6, but instead all that matters is that after the insertion of the plug 19 into a chamber 6, at the most there is still minimal play between the plug 19 and the wall of the chamber 6. In the shown embodiment, the width of the transverse webs 21 and 22 is dimensioned so that these at least nearly contact laterally on the wall of the chamber 6 after the insertion of the plug 19 into a chamber 6 and thus provide for a fixing of the plug 19 in the lateral direction. This is clearly visible in FIG. 6 which shows a cross-sectional view of an enlarged cutout of the insulating profile of FIG. 1, namely a chamber 6 and a chamber 9 with a plug 19 of a connection element 17 located in the chamber 6.

In addition, two top and bottom ribs 24 and 25, respectively, project perpendicularly from the top transverse web 21. These are dimensioned so that they at least nearly contact the separating wall between the chamber 6 and the adjacent chamber 9 or the wall sections of the chamber 6 that form the top sides of the undercuts 5A, 5B. Here, they provide for fixing the plug 19 in the vertical direction. Three additional ribs 26 project downward perpendicularly from the bottom transverse web 22. After the insertion of the plug 19 into a chamber 6, these do not contact its wall, because this is no longer necessary for fixing the plug 19 and would result only in tensioning this part. The function of the ribs 26 will be explained later.

As is visible, in particular, from the two perspective diagrams in FIG. 5, the end regions of the plug 19 are beveled, that is, both on the transverse webs 21 and 22 and also on the ribs 24, 25, and 26. This measure is used for simplifying the insertion of the plug 19 into a chamber 6.

The outer contours of the base plate 18 in the front view V correspond in part to the common outer contours of the cross section of the chambers 6 and 9 including the walls, that is, in the region of the open front side of the insulating profile 1 up to the undercuts 5A, 5B of the adjacent open chambers 2 to which corresponding cutouts 27 in the base plate 18 are allocated. Deviations consist in the front-side end region of the insulating profile 1, i.e., the projecting wall sections 10, as well as in the region of the chamber 6 facing the rear wall 8.

When a plug 19 is inserted into an insulating profile 1, the base plate 18 contacts the end faces of the walls of the chambers 6 and 9 and forms, in this way, a stop that limits the insertion depth. On the other hand, at no point does the base plate 18 project past the walls of the chambers 6 and 9, that is, not into the cross sections of the adjacent open chambers 2 above the busbars 4, so that these cross sections in which the current collectors move are not changed by the insertion of a connection element 17 and the movement of the current collectors is not disturbed.

When a plug 19 is inserted into a chamber 6 of an insulating profile 1, a snap hook 20 of the connection element 17 is simultaneously pushed into the adjacent chamber 9 of the insulating profile 1. The length of the snap hook 20 of a connection element 17 is dimensioned so that, after the complete insertion of a plug 19, i.e., when the base plate 18 contacts the end face of the profile 1, a snap hook 20 is led into form-fit engagement with the opening 16 in the projecting wall section 10 of the chamber 9, i.e., snaps into this opening. In this way, the connection element 17 is reliably fixed to the profile 1.

Through the insertion of a connection element 17 into all of the chambers 6 and 9 at the end face of a first insulating profile 1 and the subsequent placement of a second insulating profile 1 onto the connection element 17 inserted into the first insulating profile 1, the two insulating profiles 1 may be connected rigidly to each other, that is, so that they align with each other in the longitudinal direction and an unimpeded linear movement of current collectors into the open chambers 2 through the connection point is guaranteed. Through successive connection of several insulating profiles 1 each using a series of connection elements 17 and subsequent drawing of busbars into the open chambers 2, a compact, multi-pole conductor line of arbitrary length may be produced.

It is clear that the too-short air gap $L_M$ (FIG. 1) at the connection point between two insulating profiles 1 is broken by the insertion of the connection elements 17. The length of the air gaps and creep paths at the connection point is now determined by the shape of the connection elements 17. Under the assumption that, in the least favorable case, a connection element 17 can contact, with the edges of the cutouts 27 of its base plate 18, two adjacent busbars, there are three possible creep paths between two adjacent busbars on the surface of a connection element 17.

A first creep path $K_{S1}$ runs directly at the height of the busbars 4, i.e., on the connection element 17 at the height of the cutouts 27 of its base plate 18 from the inner edge 30 of a cutout 27 on the base plate 18 to the plug 19, then in a straight line in the longitudinal direction of the plug 19 on its main web 23 up to its end, around this, on the other side of the main web 23 back up to the base plate 18, and finally on this up to the inner edge 30 of the opposite cutout 27. Parts of this creep path are drawn in FIG. 5 and here marked in the side view as $K_{S1}'$ and in the front view as $K_{S1}''$, wherein $K_{S2}''$ designates the entire length of the part visible in the front view. For the length of the creep path $K_{S1}$ the following is valid: $K_{S1}=2\cdot K_{S1}'+K_{S1}''$.

Figure 6:
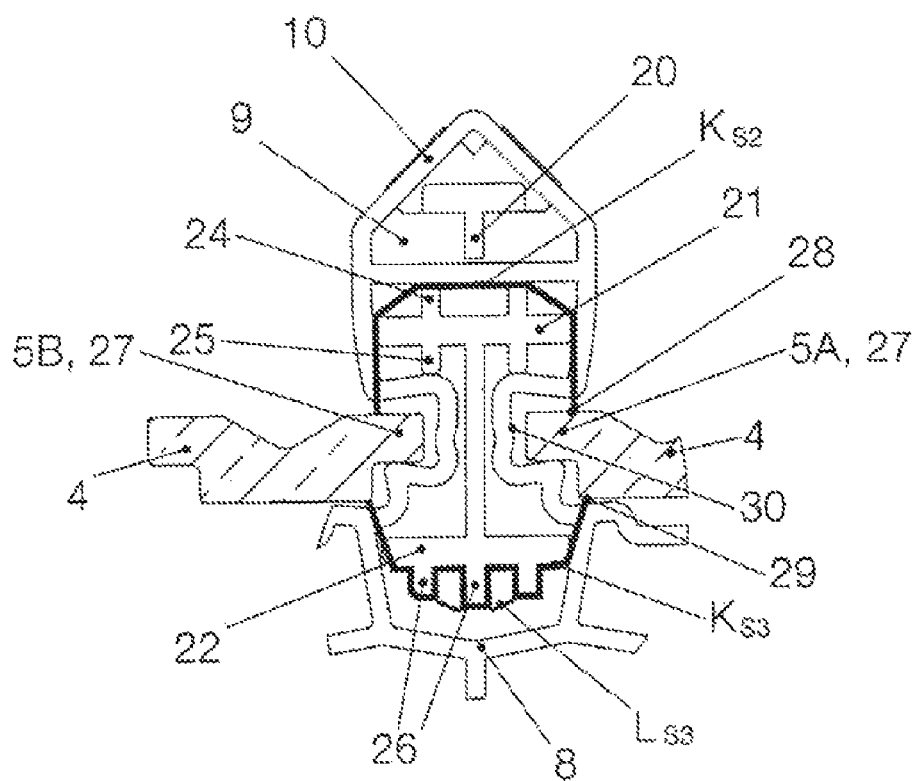

The profiles of the second and the third creep paths $K_{S2}$ and $K_{S3}$ are visible with reference to the cross-sectional view of FIG. 6 and marked there by thick lines. There exists a top creep path $K_{S2}$ that starts from an upper corner 28 of the cutout 27 of the base plate 18. On this, it leads approximately vertically up to the end of the top transverse web 21, then at an angle up to the end of the first top rib 24, then horizontally up to the end of the second top rib 24, again at an angle up to the opposite end of the top transverse web 21, and finally again approximately vertically up to the upper corner of the opposite cutout 27.

Furthermore, there is a bottom creep path $K_{S3}$ that starts from a lower corner 29 of the cutout 27 of the base plate 18. On this, it leads vertically up to the end of the bottom transverse web 22, at an angle up to the end of the first bottom rib 26, then to the bottom side of the bottom transverse web 22, then around the middle bottom rib 26, again up to the lower end of the third lower rib 26, from there again at an angle on the base plate 18 up to the opposite end of the lower transverse web 22, and finally again vertically up to a lower corner of the opposite cutout 27.

Because the base plate 18 does not extend downward past the bottom transverse web 22, but instead reaches only from the outside to the two outermost of the lower ribs 26, the bottom creep path $K_{S3}$ on the bottom side of the lower transverse web 22 between the two outermost of the lower ribs 26 exactly follows the cross section of the lower surface of the plug 19. This is not the case on the top side of the top transverse web 21, because here the base plate 18 reaches significantly past the upper transverse web 21 including the upper ribs 24. Therefore, the creep path $K_{S2}$ runs there between the ends of the two upper ribs 24 in a straight line, namely on the base plate 18.

The length of the creep path on the surface of the connection element 17 is the length of the shortest of the three paths $K_{S1}$, $K_{S2}$, and $K_{S3}$. This is then still to be compared with the lengths of the creep paths $K_V$ and $K_R$ (FIG. 1) on the end face of the insulating profile 1, wherein, in turn, the shortest of all of the paths is the final measure for the length of the overall effective creep path that must satisfy the appropriate safety regulations.

Each of the two creep paths $K_{S1}$ and $K_{S2}$ coincides with corresponding air gaps $L_{S1}$ and $L_{S2}$, respectively, because they represent along each of their profiles also the shortest possible path in free space between two adjacent busbars 4 around the connection element 17. These two air gaps $L_{S1}=K_{S1}$ and $L_{S2}=K_{S2}$ are to be compared with a third air gap $L_{S3}$ that corresponds approximately to the creep path $K_{S3}$, but is somewhat shorter than this on the bottom side of the lower transverse bar 22, because it runs there directly between the lower ends of the three lower ribs 26 and contains no loops back to the bottom side of the lower transverse web 22. The smallest of the lengths of the three air gaps $L_{S1}$, $L_{S2}$, and $L_{S3}$ is the final measure for the length of the overall effective air gap that must meet the appropriate safety regulations. It can be seen directly that this air gap is significantly longer than the air gap $L_M$ recorded in FIG. 1 without the presence of the connection element 17.

Figure 7:
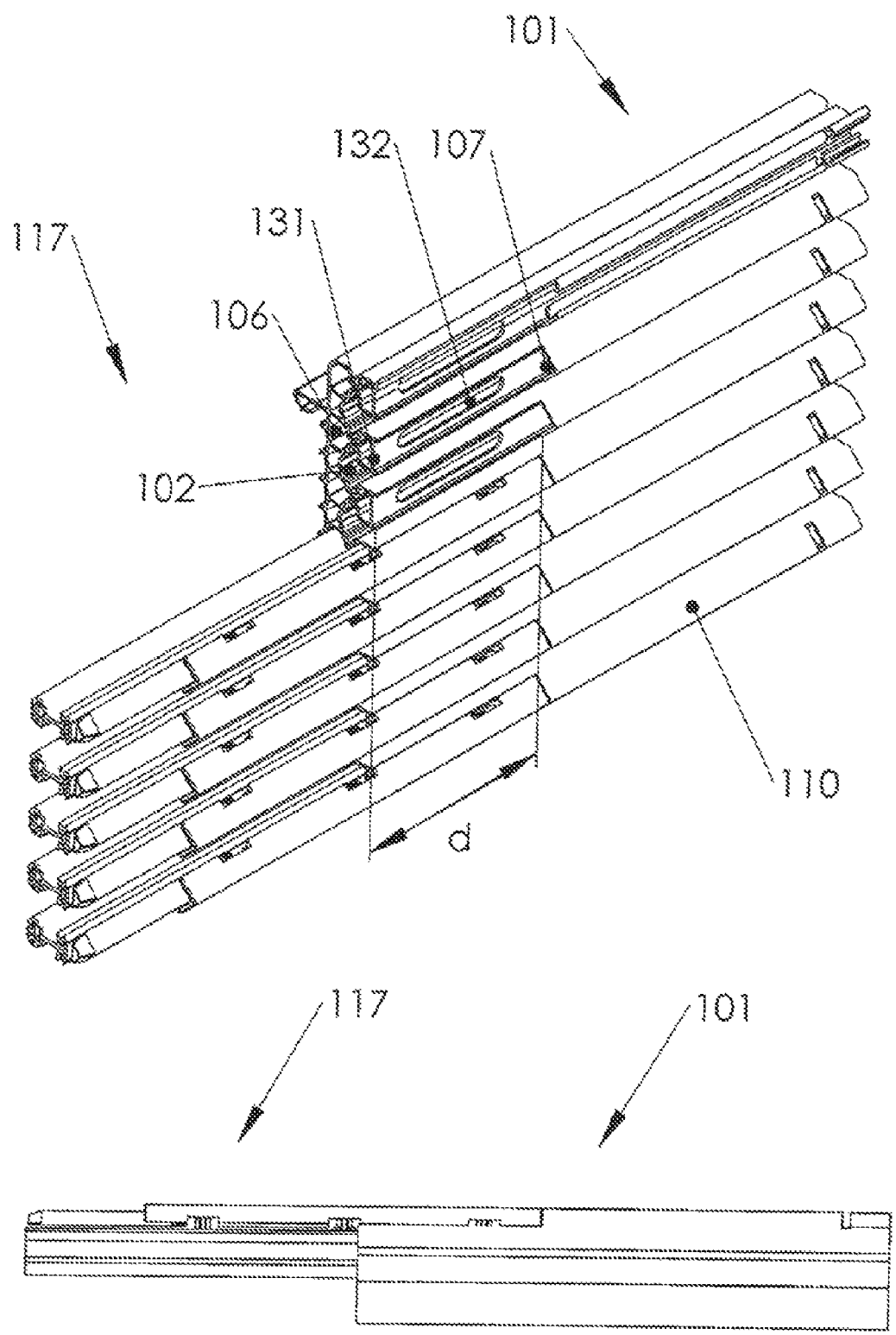

The connection element 17 described above creates a rigid connection between two successive insulating profiles 1 that is at least approximately play-free in the longitudinal direction. As mentioned above, for equalizing the very different coefficients of thermal expansion of the insulating profiles 1 and the busbars 4, a connection is needed that allows relative movement of a certain extent in the longitudinal direction and that likewise observes the appropriate insulation regulations with respect to creep paths and air gaps. With reference to FIGS. 7 and 8, another embodiment of the invention will be explained below that fulfills these requirements.

FIG. 7 shows a perspective view and also a side view of an insulating profile 101 that illustrates a modification of the insulating profile 1 from FIG. 1 and differs from this merely through a modification of one of its two end regions, but otherwise has exactly the same cross-sectional shape as the insulating profile 1 of the first embodiment. In FIG. 7, a connection element 117 of a second, multi-part type is to be seen inserted into the insulating profile 101, with this element being shown by itself in FIG. 8. This connection element 117 has multiple parts and is made from an attachment element 118 illustrated in FIG. 8 at the top and in the middle in two different perspective views from below and from above, respectively, and is made from a plug element 119 illustrated in FIG. 8 at the bottom in a perspective view from the side, and is also made from two insert elements 118A and 118B of which, in FIG. 8, to be seen at the top and in the middle one as a separate part at the right next to the attachment element 118 and one connected to the attachment element 118 on its left end.

Figure 4:
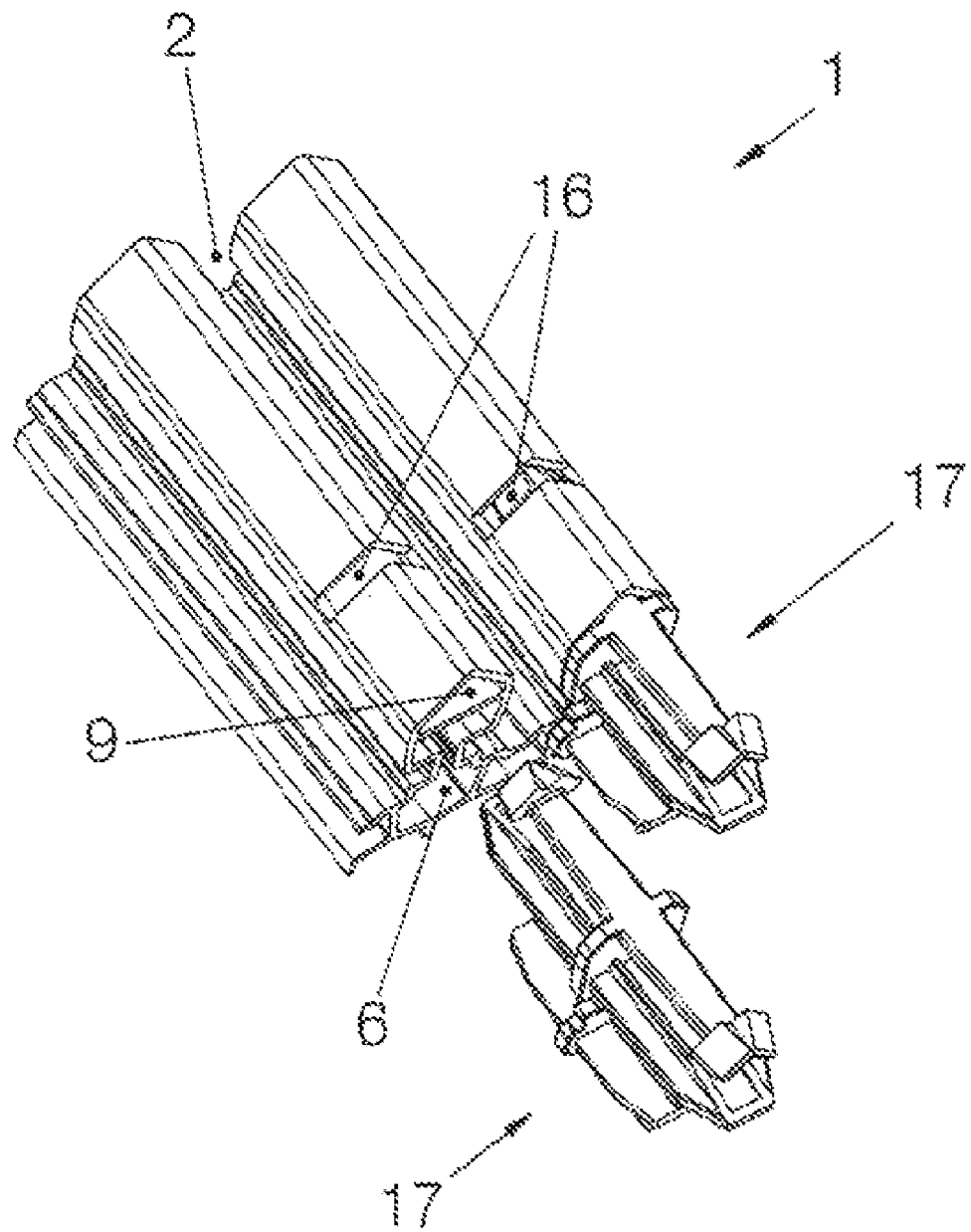

As a comparison of FIG. 8 at the bottom with FIGS. 4, 5, and 6 shows, analogous to the adaptation of the cross-sectional shape of the plug 19 to the cross-sectional shape of the closed chambers 6 of the insulating profile 1, the cross-sectional shape of the plug element 119 is also adapted to the cross-sectional shape of the closed chambers 106 of the insulating profile 101, wherein each of these chambers lies between two open chambers 102 equipped with busbars 4, such that the plug element 119 can be inserted, at the most, with little play into a closed chamber 106, i.e., the outer contours of the cross section of the plug element 119 approximately corresponds in the second embodiment to the inner contours of the cross section of the chamber 106. Merely at its bottom side facing the rear side of the insulating profile 101 in the inserted state, the outer contours of the cross section of the plug element 119 deviates significantly from the inner contours of the cross section of the chamber 106 and instead coincides approximately with the contours of the bottom side of the plug 19 of the first embodiment, so that the creep path around the bottom side of the plug element 119 has approximately the same shape as the creep path $K_{S3}$ drawn in FIG. 6 around the bottom side of the plug 19.

The plug element 119 has a main web 123 just like the plug 19. In contrast to the plug 19, however, instead of the upper and lower transverse webs 21 and 22 there, an upper closed chamber 121 and a lower closed chamber 122 are provided that extend in the longitudinal direction of the plug element 119 and are connected to each other by the main web 123 on their entire length. In comparison with corresponding transverse webs, these closed chambers 121 and 122 impart to the plug element 119 a higher rigidity that is necessary, because, in contrast to the connection element 17, the connection element 117 must bridge a gap acting as an expansion joint between two successive insulating profiles 101 and must provide sufficient mechanical stability in this region. For this reason, the plug element 119 of the connection element 117 is also significantly longer than the two plugs 19 of a connection element 17 together, because the plug element 119 must project relatively far into each of the two insulating profiles 101 that should be connected to each other, in order to provide for sufficient stability of the connection. Here, in contrast to the plug 19 of the connection element 17, the insertion depth is initially not limited by a stop, because an element corresponding to the base plate 18 there is missing in the plug element 119.

As illustrated in FIG. 7, in comparison with the insulating profile 1, outward from an end face along a path of the length d, the upper, roof-shaped wall 110 of the closed chamber 107 is missing in the insulating profile 101, wherein this wall connects to the closed chamber 106 at the front side of the insulating profile 101. In this way, the separating walls 131 between the closed chambers 106 and the chambers 107 lying above are exposed along this path. In these separating walls 131 there are elongated holes 132 whose longitudinal direction corresponds to the longitudinal direction of the insulating profile 101 and that are each arranged across the entire width of the insulating profile 101 at the same distance from the end face of this profile.

Each of the plug elements 119 has boreholes 133-135 on the top side of its upper chamber 121. Through the insertion of a plug element 119 into a closed chamber 106 of the insulating profile 101, one of the two outer boreholes 133 or 135 of the plug element 119 may be brought into a position in which it is covered by an elongated hole 132 in the separating wall 131 of the insulating profile 101.

If the plug element 119 is inserted into a closed chamber 106 of the insulating profile 101 so far that the outer borehole 135 is covered by the elongated hole 132 and is simultaneously inserted with its opposite end into another, identical insulating profile 101 so far that the other outer borehole 133 is covered by an elongated hole 132 of the other insulating profile 101 there, then by adding the attachment element 118 simultaneously fulfilling the functions of a locking device and a stop, a connection between the two insulating profiles 101 can be created, wherein this connection is fixed but can move in the longitudinal direction of the insulating profiles 101 to a specified extent, as explained below.

The attachment element 118 is made from an elongated main part 136 and three engagement elements 137-139 projecting downward vertically from this main part. The shape of the top side of the main part 136 corresponds to that of the front wall 110 of the closed chamber 107. Each of the engagement elements 137-139 is allocated to one of the boreholes 133-135 in the plug element 119 and comprises at least two snap hooks 140 that project downward vertically from the main part 136 of the attachment element 118 and that each have a circular-segment-shaped cross section, so that an approximately circular cross section is produced overall for the engagement elements 137-139. Purely as an example, in FIG. 8 engagement elements 137-139 are each shown with four snap hooks. The outer engagement elements 137 and 139 are designed, after the insertion of the plug element 119 into the corresponding closed chambers 106 of two successive insulating profiles 101, to be inserted through the elongated holes 132 in the separating walls 131 of the two insulating profiles 101 into the outer boreholes 133 or 135 of the plug element 119 located underneath.

Before this takes place, however, in each of the two insulating profiles 101 to be connected, an insert element 118A and 118B, respectively, is inserted. These insert elements 118A and 118B have a cross-sectional shape adapted to the inner contours of the closed chambers 107 of an insulating profile 101 and that allows it to be inserted with little play into such a closed chamber 107. At one end, each insert element 118A and 118B has two cutouts 141 that are suitable for the form-fit engagement with two fitting projections 142 on the bottom side of the main part 136 of the attachment element 118. The insert elements 118A and 118B are placed, after insertion of the plug elements 119, on the separating walls 131 of the insulating profiles 101 to be connected and are each pushed so far into the closed chambers 107 that the cutouts 141 are located at a position at which they are led into engagement with the projections 142 for the subsequent insertion of the engagement elements 137 and 139 of the attachment element 118 into the boreholes 133 or 135 of the plug element 119. Through this engagement, the insert elements 118A and 118B are fixed with respect to the attachment element 118 in the longitudinal direction. The insert elements 118A and 118B always keep covered the region in which the outer wall 110 of a closed chamber 107 is missing independent of the position that is variable in the longitudinal direction of the attachment element 118 relative to the insulating profile 101 and provide in this region for an approximate continuity of the shape of the front side of the insulating profile 101.

When the engagement elements 137 and 139 of the attachment element 118 are inserted into the boreholes 133 and 135 of the plug element 119, respectively, the middle engagement element 138 is simultaneously inserted into the middle borehole 134 of the plug element 119 located underneath, but here without penetrating one of the two insulating profiles 101 to be connected. Instead, after the insertion of the plug element 119 into the two insulating profiles 101 to be connected to a depth suitable for adding the attachment element 118 between the two insulating profiles 101, there is still an intermediate space whose width corresponds at least to the diameter of the middle borehole 134 in the plug element 119.

When the three engagement elements 137-139 are inserted into the boreholes 133 to 135 of the plug element 119, the snap hooks 140 of all three engagement elements 137-139 are led into form-fit engagement with the plug element 119, by means of which the attachment element 118 is locked as a whole rigidly to the plug element 119. Simultaneously, a form-fit connection between the two-part connection element 117 and each of the two insulating profiles 101 to be connected is created here by each of the two outer engagement elements 137 and 139, in that the separating wall 131 of each insulating profile 101 is clamped between the plug element 119 and the attachment element 118 of the connection element 117. However, a relative movement is still possible in the longitudinal direction between each of the two insulating profiles 101 and the connection element 117, in that each of the outer engagement elements 137 and 139 can be pushed in the longitudinal direction in the elongated hole 132 in the separating wall 131 in which it is located.

While the snap hooks 140 of an engagement element 137 or 139 facing the middle of the attachment element 118 block the connection element 117 from being able to be pulled from the insulating profile 101 in the longitudinal direction through their engagement with the section of the separating wall 131 of the insulating profile 101 set between the elongated hole 132 and the end face of the corresponding insulating profile 101 at the outer end of the elongated hole 132, the movement range of the connection element 117 in the opposite direction is advantageously not limited by a corresponding engagement of the two other snap hooks 140 of the same engagement elements 137 and 139, respectively, to the separating wall 131 of the insulating profile 101 on the opposite end of the elongated hole 132, although, in principle, this would be possible.

Instead, the length of the elongated hole 132 is advantageously dimensioned so that the two insulating profiles 101 connected by the connection element 117 may be pushed so far toward each other until their end faces contact each other. The latter is prevented, however, by the main part 136 of the attachment element 118 that is longer than twice the length d of the path on which the upper, roof-shaped wall 110 of the closed chamber 107 is missing. The main part 136 thus acts as a stop that keeps the two insulating profiles 101 at a specified minimum distance from each other.

The snap hooks 140 of the middle engagement element 138 have a shape that is somewhat different than that of the two outer engagement elements 137 and 139, i.e., they are not completely rounded toward the middle of the attachment element 118, but instead they are provided there with a pronounced edge 143. The purpose of this measure is to push aside dust and dirt that can accumulate in this region over time during contraction movement of the expansion joint.

It is clear that the movement range created by the connection element 117 between two successive insulating profiles 101 in the longitudinal direction is suitable, in the case of suitable dimensioning, for equalizing different coefficients of thermal expansion of the insulating profiles 101 and the busbars 4, i.e., for providing expansion joints for a conductor line. Because the expandable connections using insulating profiles 101 and connection elements 117 of the last-described type are more complicated both in terms of shaping of the associated components and also the sequence of assembly than the non-expandable connections using insulating profiles 1 and connection elements 17 of the previously-described type, along a conductor line preferably only as many expandable connections are provided at regular intervals as is necessary for equalizing the length expansions to be expected overall and for the other connections, the simpler, non-expandable variants are used.

From the preceding description of an embodiment, for those skilled in the art, a plurality of possible variations are realized for the shape of the cross section of the insulating profile 1 and the form of the connection element 17. With respect to the plug 19 of the first embodiment, its cross-sectional basic shape does not absolutely have to correspond to the capital letter I, but instead the transverse webs 21 and 22 may also run at an angle with respect to the main web 23, so that the upper half would have a cross-sectional basic shape corresponding to the capital letter Y and/or the lower half would have a cross-sectional basic shape rotated, in contrast, by 180°. Obviously, the number, position, and height of the ribs 25, 25, and 26 may also be varied, if necessary. In the case of the plug element 119 of the second embodiment, there are also possible corresponding variations. The decisive feature is always that it provides, due to its cross-sectional shape and its length, a sufficient creep-path length on its surface along any possible path between adjacent busbars.

The invention claimed is:

1. A multi-pole conductor line for providing current to a current collector of a vehicle, the conductor line comprising:
   a plurality of insulating profiles that are arrangeable end to end with respect to a longitudinal dimension of the insulating profiles, each of the insulating profiles having a regular arrangement of a plurality of chambers extending along the longitudinal dimension, at least one of the plurality of chambers being closed in cross section, and at least one of the plurality of chambers sized and dimensioned for holding a busbar, the held busbar accessible to the current collector along the longitudinal dimension; and
   a connection element formed with an insulating material, each connecting element including two plug elements, each plug element insertable into a closed cross section chamber of a separate insulating profile when the insulating profiles are arranged end to end with respect to each other, to thereby connect the separate insulating profiles, and at least one stop element that limits an insertion depth of a plug element in an insulating profile.

2. The conductor line according to claim 1, wherein the connection element includes at least one catch element engageable between the connection element and an insulating profile.

3. The conductor line according to claim 1, wherein the connection element includes a stop element disposed between plug elements, the stop element sized and dimensioned to contact an end face of an insulating profile, and to not enter into a chamber of an insulating profile, when a plug is inserted into an insulating profile.

4. The conductor line according to claim 3, wherein outer contours of an outer surface of the stop element correspond at least partially to an outer contour of an outer surface of a closed chamber of the insulating profile.

5. The conductor line according to claim 3, wherein the stop element maintains a minimum distance between two insulating profiles.

6. The conductor line according to claim 1, further including:
one or more openings formed in at least one of said plurality of closed cross section chambers;
one or more snap hooks projecting from the connection element each snap hook shaped and arranged to form-fit into engagement a corresponding one of said one or more openings.

7. The conductor line according to claim 6, wherein the one or more snap hooks of the connection element are arranged on the base plate whereby when a plug is inserted into an insulating profile, the snap hook is led into a closed chamber of the insulating profile, and the form-fit engagement with the opening is engaged from an inner side of a chamber closed in cross section.

8. The conductor line according to claim 7, wherein the form-fit engagement between the connection element and an insulating profile is shaped and dimensioned to limit an extent of relative movement of the connection element relative to the insulating profile along the longitudinal dimension of the insulating profile.

9. The conductor line according to claim 8, wherein the one or more openings of the insulating profile are accessible from an exterior of the insulating profile, and extend along the longitudinal dimension of the insulating profile, and after forming a form-fit connection between an opening and a snap hook, the snap hook may slide within the opening along the longitudinal dimension to thereby permit relative movement between a connection element and an insulating profile.

10. A multi-pole conductor line for providing current to a current collector of a vehicle, the conductor line comprising:
a plurality of insulating profiles that are arrangeable end to end with respect to a longitudinal dimension of the insulating profiles, each of the insulating profiles having a regular arrangement of a plurality of chambers extending along the longitudinal dimension, at least one of the plurality of chambers being closed in cross section, and at least one of the plurality of chambers sized and dimensioned for holding a busbar, the held busbar accessible to the current collector along the longitudinal dimension; and
a connection element formed with an insulating material, each including two plug elements, each plug element insertable into a closed cross section chamber of a separate insulating profile when the insulating profiles are disposed end to end with respect to each other, to thereby connect the separate insulating profiles, and at least one stop element that limits the insertion depth of a plug element in an insulating profile, wherein a specified minimal length is defined, of a path that extends along the surface of a connection element and that leads, when the connection element is inserted into two insulating profiles, from a first point on the surface of the plug element lying closest to a first busbar, to a second point on the surface of the connection element lying closest to another busbar.

11. Conductor line according to claim 10, wherein a shortest path extending around a longitudinal end of the plug element between corresponding inner edges of two cutouts of a base plate is the same length as or longer than a shortest path extending along a surface of an open front side of the insulating profile between undercuts of two adjacent busbar holding chambers.

12. The conductor line according to claim 10, wherein a creep path defined as the shortest path extending along a periphery of a base plate of the connection element is the same length as or longer than the shortest distance between surfaces of adjacent busbars at an open front side of the insulating profile when the busbars are held.

13. The conductor line according to claim 10, wherein the plug element and the stop are simultaneously connectable with each other and at least one insulating profile.

14. The conductor line according to claim 10, wherein at least one plug element is formed with at least one opening, and at least one of said closed cross section chamber is provided with at least one opening, whereby when said at least one plug having an opening is inserted into said at least one cross section chamber having an opening, an engagement element may be inserted through the cross section chamber opening and plug opening to secure a position of the plug relative to the cross section chamber.

15. A conductor line having bus bars for providing current to a current collector of a vehicle, the conductor line comprising:
a plurality of insulating sections each defining a current collector engaging surface and a longitudinal dimension defined relative to a direction of travel of the vehicle, the insulating sections engageable end to end with respect to the longitudinal dimension, each of the insulating sections defining
a plurality of first chambers extending along the longitudinal dimension, sized and dimensioned to secure a bus bar, and being open along the engaging surface to admit contacting passage of the current collector along the bus bar,
a plurality of second chambers being closed along the engaging surface and disposed between adjacent first chambers to electrically insulate adjacent bus bars, the second chambers having an exterior dimension defining a minimum length of surface area between adjacent bus bars; and
a connection element formed with an insulating material, each connection element including two plug elements, each plug element insertable into a closed cross section chamber of individual insulating profiles when the insulating profiles are disposed end to end with respect to each other, to thereby connect the insulating profiles and insulate adjacent bus bars, and at least one stop element that is sized and dimensioned to limit the insertion depth of a plug element into an insulating profile, and to maintain a minimum distance between the insulating profiles.

* * * * *